United States Patent [19]
Olson et al.

[11] Patent Number: 5,290,618
[45] Date of Patent: Mar. 1, 1994

[54] AUTOMOBILE FENDER PROTECTOR

[76] Inventors: Richard R. Olson, 1721 Center St., Centerville, Minn. 55038; Brian J. Regnier, 3827-97th La. NE., Circle Pines, Minn. 55014

[21] Appl. No.: 969,372

[22] Filed: Oct. 30, 1992

[51] Int. Cl.⁵ .................. B60R 27/00; B32B 3/06
[52] U.S. Cl. ..................... 428/100; 428/102; 428/124; 428/130; 428/194; 150/166; 280/770
[58] Field of Search ........... 428/100, 102, 124, 130, 428/194; 150/166; 280/770

[56] References Cited

U.S. PATENT DOCUMENTS

| | | | |
|---|---|---|---|
| 2,880,015 | 3/1959 | Harben | 280/150 |
| 3,298,712 | 1/1967 | Greenstadt | 280/150 |
| 3,924,212 | 12/1975 | Brown | 335/303 |
| 4,849,272 | 7/1989 | Haney et al. | 428/102 |
| 4,884,824 | 12/1989 | Radke | 150/166 |
| 4,895,753 | 1/1990 | Etter | 428/286 |
| 5,042,836 | 8/1991 | Swanson | 150/166 |

*Primary Examiner*—Alexander S. Thomas
*Attorney, Agent, or Firm*—Leo Gregory

[57] ABSTRACT

A single layer protective cover of a flexible synthetic leather-like material resistant to automotive chemicals and having a smooth cushioning non-slipping non-scratching inward or under surface of a length and width to cover an automotive fender adequately for its protection against scratches while a technician is working under the raised hood of the automobile and flexible means having terminal hooks to secure said cover.

4 Claims, 2 Drawing Sheets

AUTOMOBILE FENDER PROTECTOR

BACKGROUND OF THE INVENTION

1. Field of Invention

This invention relates to protective covering particularly adapted for the fender of an automotive vehicle.

2. Description of the Previous Art

Fender covers are in common use to protect the fender of an automotive vehicle while being repaired in an automotive repair shop or at any other place to have access to engine compartment with the hood of the vehicle in a raised position.

Some protective covers have no fastening means but extend over the fender sufficiently to have a portion under the hood for securing purposes. This is an obviously inconvenient arrangement.

In common use are magnets for holding purposes. However with the use of non-metallic fenders, the magnets do not hold. During the winter season with ice coating on vehicles, magnets do not provide a secure hold. Further, magnetic covers tend to attract metal debris which may damage a vehicles body finish.

SUMMARY OF THE INVENTION

It is desirable and an object herein to provide an automotive vehicle fender cover which is adapted to cover the outer surface of the fender and not extend into the engine compartment of the vehicle. Further, it is desirable to have a positive means to securely hold the protective cover once it is positioned.

It is a further object herein to provide a protective fender cover having fastening or securing means which secure the cover conveniently regardless oil the underlying or adjacent material of which the vehicle may be made.

It is also an object herein to use a material that is resistant to automotive chemicals providing positive protection to the underlying fender.

It is also another object herein to provide a protective cover which may be conveniently used elsewhere about a vehicle other than just as a fender cover. With the fastening means provided the cover may be positioned at any work area of the vehicle where there are adequate holding places for the fastening means.

It is also an object herein to provide a sleeve in the cover that will permit the cover to freely slide on the fastening means whereby the cover can be easily positioned or repositioned at the work area once the cover is secured.

These and other objects and advantages of the invention will be set forth in the following description made in connection with the accompanying drawings in which like reference characters refer to similar parts throughout the several views.

DESCRIPTION OF A PREFERRED EMBODIMENT

Figure 1:
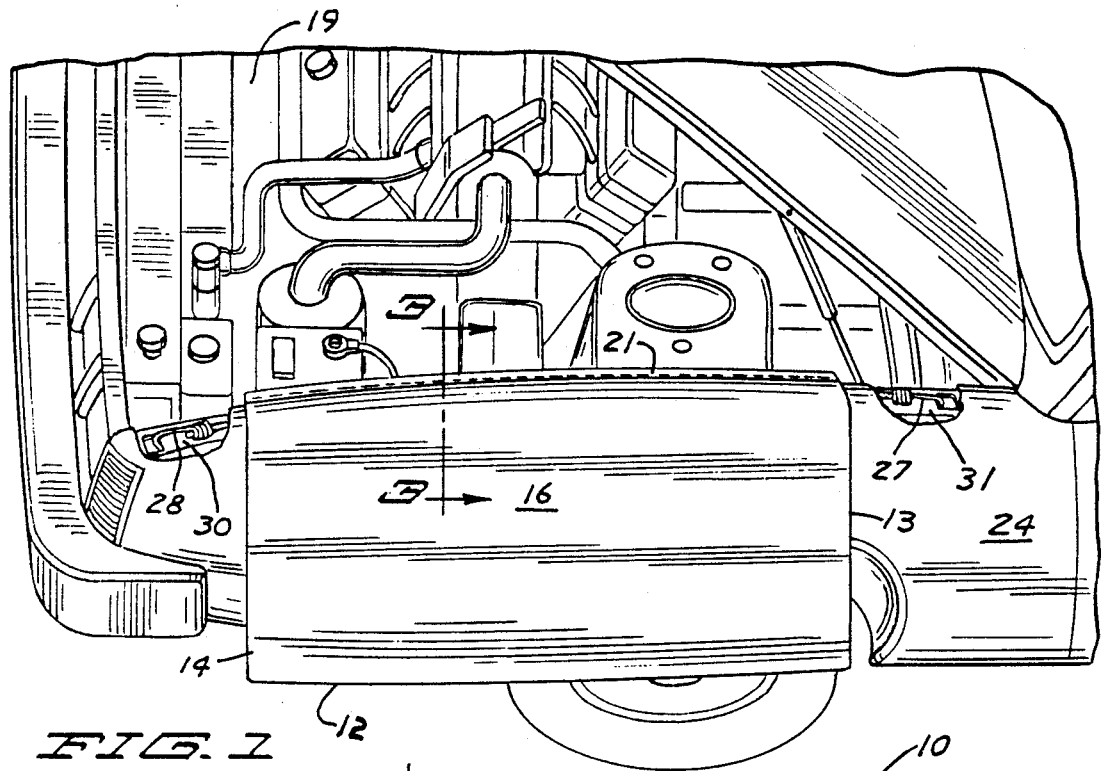
FIG. 1 is a view of the protective cover herein in side elevation in an operating position.
Figure 2:
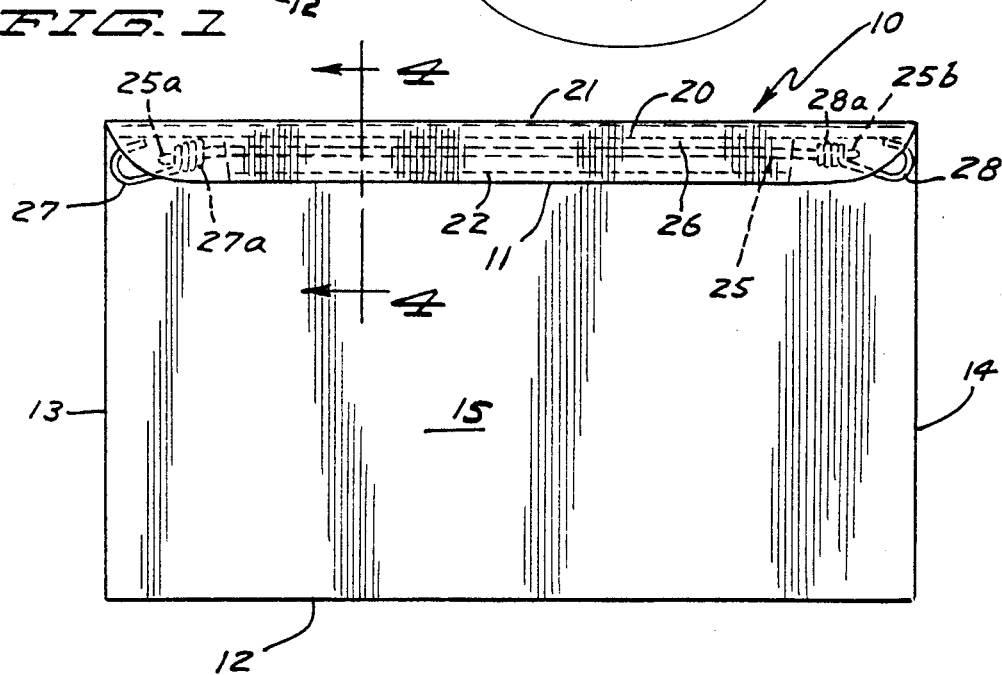
FIG. 2 is a view in elevational of the under or rear side of the protective cover herein.

Referring to the drawings and more particularly to FIG. 2, an elevational view of the invention in the protective cover herein is indicated at 10. The sides and ends are indicated at 11-14, the under side is indicated at 15 and the outer or top side at 16.

Said cover will be made up of a flexible leather-like synthetic material resistant to automotive chemicals and grease, impermeable to moisture and having a non-slipping non-scratching under surface and being foldable without creating any lasting crease marks. Material such as indicated is readily available and very desirable to use.

The dimensions of said cover are relative and will be of a size to overlie a sufficient length of a fender in a position of use. The thickness of the cover will be of such to cushion the fender against any denting as in the event of a tool or part dropping thereon.

With the use of the suggested material, the edges need no binding or stitching. However the side 11 has a specific function.

Figure 3:
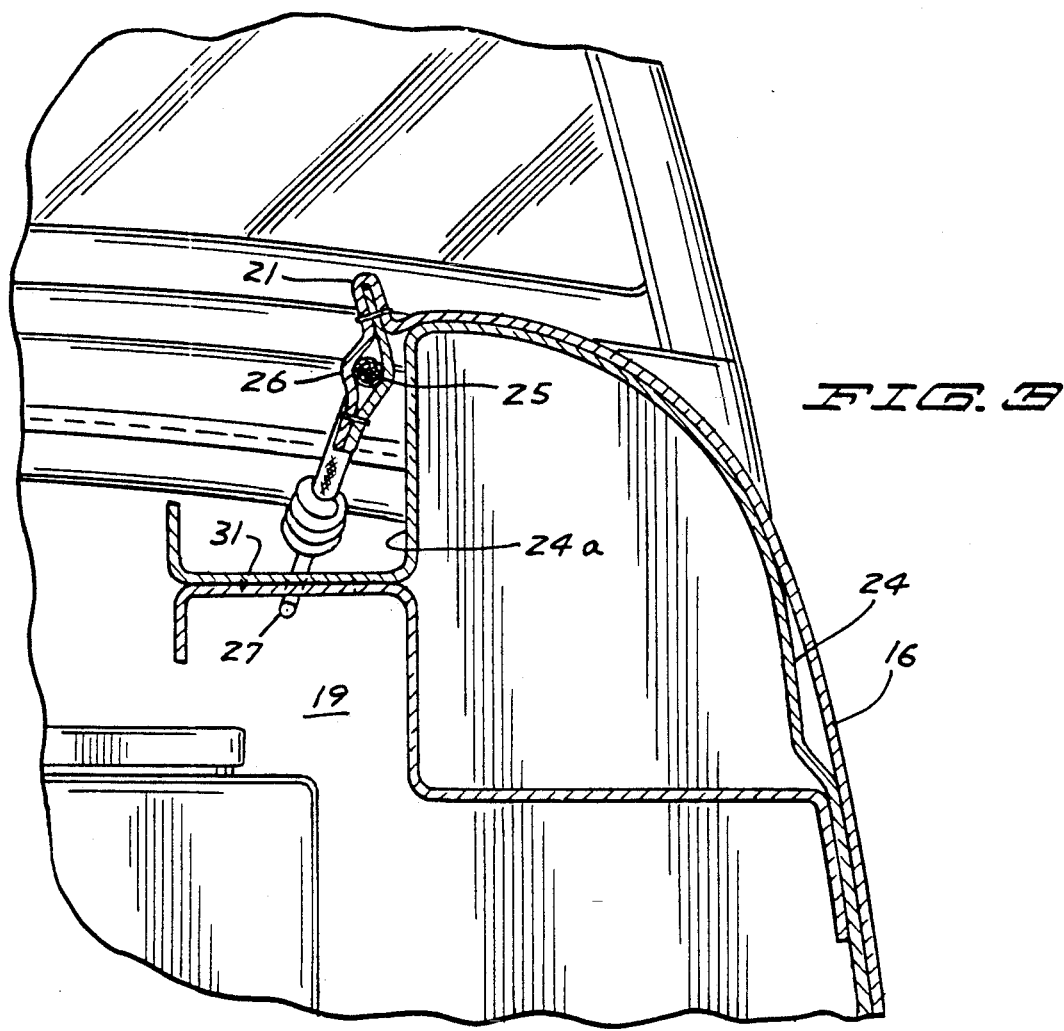
FIG. 3 is a partial view in vertical section taken on line 3—3 of FIG. 1 as indicated.
Figure 4:
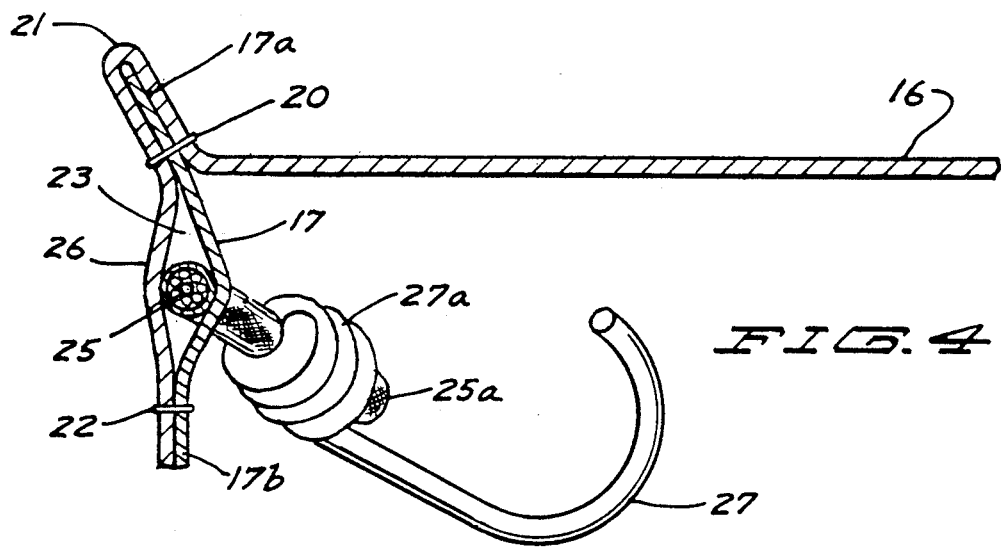
FIG. 4 is a partial view in vertical section taken on line 4—4 of FIG. 2 as indicated.

With reference to side 11, this is the side which will lie against the inner edge of the fender along side of the engine compartment 19 as indicated in FIG. 3.

Underlying the underside 15 of the edge portion 11 to the extent on the order of one and one half inches is a strip of suitably durable material 17. Said edge portion is then doubled over and the seam at 20 is sewn forming thereabove a narrow rib 21. This seam sews in the inner edge 17a of said strip of material. A second seam is stitched at 22 which sews the outer free edge 17b of said strip of material to the adjacent free edge of said side 11. However the stitching along said strip of material is short of the respective sides 13 and 14 of said cover as will be further described. Note FIG. 2.

Thus a sleeve 23 is formed between said strip of material and the overlying cover 10. This stitched portion is referred to as a flange 26. Although not here shown, a sleeve may be formed by stitching a doubled over edge portion of the side 11.

Disposed through said sleeve, as here shown, is a resilient or stretchable cable 25 which is here indicated as being cloth covered and the same is of conventional structure. Said cover by means of said sleeve can slide freely along said cable for positioning said cover when ,said cable is stretched in becoming fastened.

At each end of said cable is a hook, indicated at 27 and 28. To avoid scratching, the hooks are indicated as having a protective coating such as of plastic.

Said cable is here shown being of such a length in a non-stretched position such that with the hooks thereon, the total length does not exceed the length of the side 11 and may be somewhat less. Note FIG. 2.

Said hooks are secured to said cable in a conventional manner. Coils 27a and 28a form the rear end portion of each of said hooks. The ends of the cable are disposed through said coils and a metal clamp is fastened to each end of said cable as indicated at 25a and 25b, these clamps bear against the inner ends of said coils as shown and thus the hooks are secured to said cable.

Said coiled portions of said hooks are larger in cross section than the sleeve 23 and bear against the ends of the sleeve being unable to pass or slip therethrough.

Thus is described the cover 10. Although designated as a protective fender cover, said cover 10 may be used elsewhere about a vehicle and holding places are readily found for attachment by said hooks.

In being used as a fender cover, with the hood raised, it very nicely covers the inner edge 24a of the fender 24 with said flange portion 26 being positioned thereagainst adjacent the engine compartment.

It is noted here that with the hood raised, there are adequate underlying small recesses 30 and 31 at each end of the fender right adjacent the engine compartment to have said cover 10 overlie an adequate length and depth of the fender.

In prior art covers, in almost every instance the inner edge of the cover would extend into the engine compartment to different extents which means that the cover could well be in the way of the service being performed under the hood in the engine compartment.

The hold here is positive and once secured the cover will stay secured. This is not the case of a magnet held cover where the magnets may become shifted as a result of becoming engaged in the process of the work effort or in the case of a synthetic fender where a magnet will not hold. The hooks here give a positive hold.

It will of course be understood that various changes may be made in the form, details, arrangement and proportions of the product without departing from the scope of the invention, which generally stated consists in a device capable of carrying out the objects above set forth, such as disclosed and defined in the appended claims.

What is claimed is:

1. A protective fender cover, comprising
   a single layer of a flexible leather-like material cover of an extent to overlie an adequate length of the outer surface of an automotive vehicle fender,
   a flange formed along one side edge portion of said cover by doubling over said edge portion,
   a liner underlying said doubled over edge portion formed of a leather-like material having an inner edge extending between said doubled over edge portion and an outer free edge and being short of the ends of said flange,
   a seam stitched across and adjacent the top of said doubled over portion engaging the edge of said doubled over portion and engaging the adjacent inner free edge of said liner,
   a seam stitched across the free edge of both said liner and of said doubled over flange portion,
   a sleeve formed by said stitched liner between said seams,
   a resilient cable disposed through said sleeve, and
   a hook member at each end of said cable.
2. The structure of claim 1, wherein
   said cover is disposed to overlie a fender having said flange disposed to lie against the inner side edge of a fender adjacent the engine compartment,
   hook fastenings at the inner side of said edge of said fender adjacent each end thereof, and
   said hook members engaging said inner side edge of said fender at each end thereof securing said cover.
3. The structure of claim 1, wherein
   said hook members being of a width to prevent retraction into said sleeve.
4. The structure of claim 1, wherein
   said cover by means of said sleeve is freely slidable along said cable for positioning or change in position of said cover.

* * * * *